United States Patent [19]

Sanders

[11] 4,016,826
[45] Apr. 12, 1977

[54] WATER SPIDER

[75] Inventor: David H. Sanders, Hamlin, Tex.

[73] Assignee: M. H. Sanders et al., Hamlin, Tex.

[22] Filed: Apr. 5, 1976

[21] Appl. No.: 673,714

[52] U.S. Cl. .............................. 115/26; 9/310 D; 115/19; 272/1 B

[51] Int. Cl.² ...................................... B63H 16/00

[58] Field of Search .............. 115/19, 21, 22.3, 25, 115/26, 26.1, 26.2, 66, 26.3; 272/1 B, 1 E; 9/310 R, 310 C, 310 D; 280/221

[56] References Cited
UNITED STATES PATENTS

| 1,248,013 | 11/1917 | Risso | 115/26.1 |
|---|---|---|---|
| 1,533,824 | 4/1925 | Benjamin | 280/221 |
| 3,237,589 | 3/1966 | De Biasi | 115/19 |
| 3,318,614 | 5/1967 | Lee | 280/221 |
| 3,628,491 | 12/1971 | Conrad | 115/19 |
| 3,835,494 | 9/1974 | Dougherty | 9/310 D |

Primary Examiner—Trygve M. Blix
Assistant Examiner—Stuart M. Goldstein
Attorney, Agent, or Firm—Wendell Coffee

[57] ABSTRACT

Four cylindrical floats with paddles are mounted upon crankshafts having double cranks thereon. The crankshafts are connected by treadle boards. When the treadles are operated by a standing person, the vehicle is propelled forward.

20 Claims, 10 Drawing Figures

U.S. Patent  April 12, 1977  Sheet 1 of 2  4,016,826
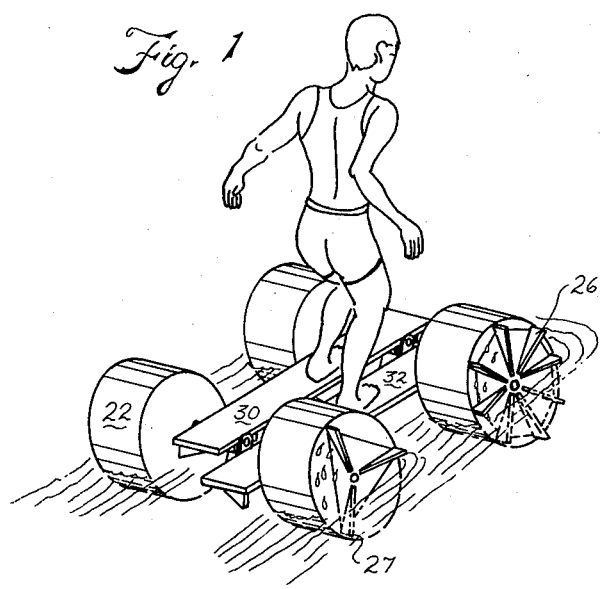
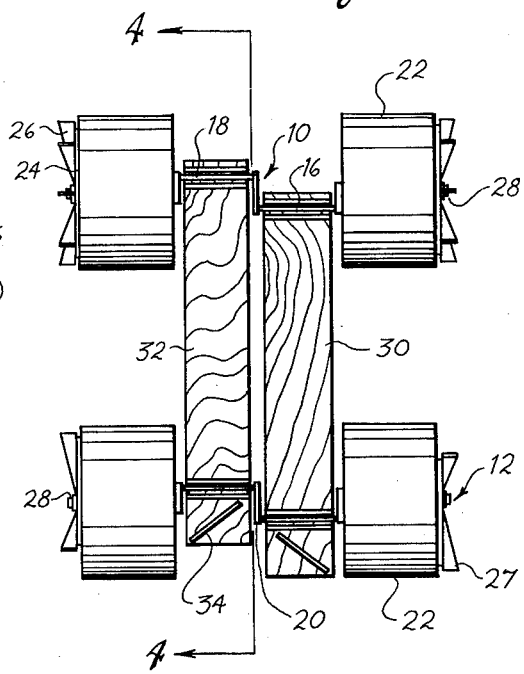
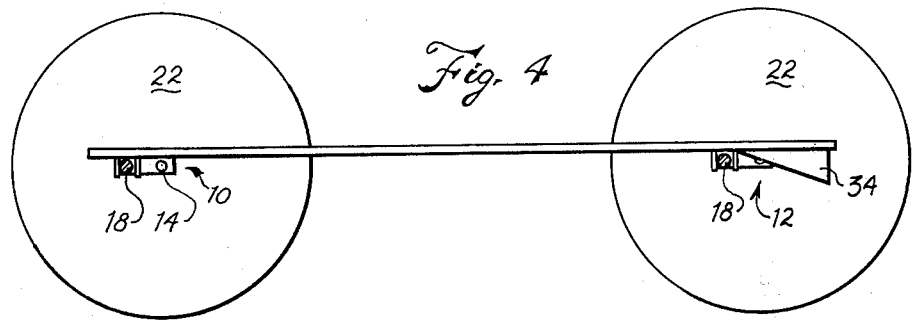
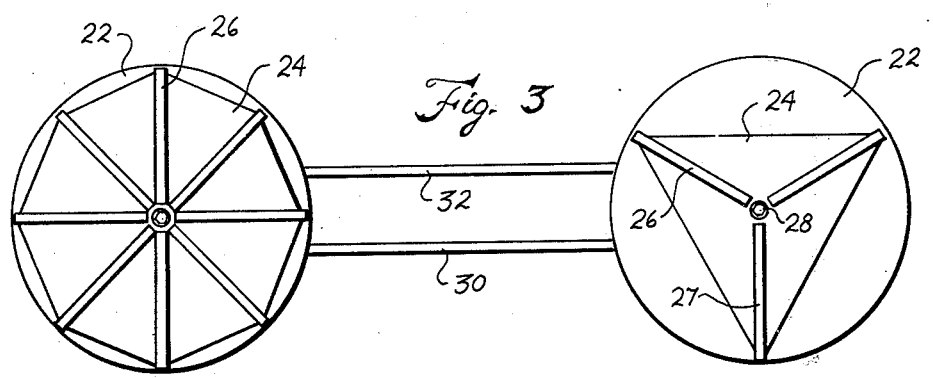

WATER SPIDER

BACKGROUND OF THE INVENTION:

1. Field of the Invention.

This invention relates to marine propulsion and more particularly to marine pedomotors wherein the operator stands erect.

2. Description of the Prior Art.

Various water vehicles which are propelled by the feet have been known before. A common type often seen in parks is a catamaran where one or more passengers sit on a bench and propell a paddle wheel by pedals and steer with a rudder attached to a tiller.

RISSO, U.S. Pat. No. 1,248,013, discloses a marine vehicle wherein the operator stands erect on a pair of pontoons and there is a single paddle wheel between the pontoons.

PLANTS, U.S. Pat. No. 3,249,084, discloses a water tricycle. LEE, U.S. Pat. No. 3,318,614, discloses a land vehicle having four wheels eccentrically mounted on crankshafts. Treadle boards are mounted on the double crankshafts.

Applicant was also aware of the following patents at the time he filed this application:

| Conrad | 3,628,491 |
|---|---|
| Hetland | 3,088,732 |
| Modena (Italian) | 689,034 |

SUMMARY OF THE INVENTION:

1. New and Different Function.

I have invented a water vehicle of extremely shallow draft, readily maneuvered and of simple construction. Two crankshafts, each having two cranks, are connected solely by treadle boards. Each crankshaft has a cylindrical float coaxially connected on each end thereof. Paddles project from the outboard face of the floats. The each of the after floats have only three paddles. Therefore, if the operator stands midship and operates the treadle boards, the vehicle will tend to move straight forward. The operation is somewhat of a natural walking step and, therefore, the operator "walks on water."

However, if the operator shifts his weight to one treadle board only, the vehicle will turn in that direction. This is because a drag paddle is aligned with the adjacent crank. Therefore, if the weight is shifted to the port treadle board, the drag paddle in this position will have considerable draft. Therefore, the vehicle will tend to turn about the more deeply submerged drag paddle in the water.

Also to aid in turning, it is possible to place a fin on the rear of the treadle boards. This fin angles outward, as seen in the drawing, so when one of the treadle boards is stopped in the depressed position, particularly with the weight to the rear so the back of the treadle board itself is submerged, the fin also aids in the turning motion.

Obviously, the vehicle is adaptable to childrens' recreational use. In addition, because of its shallow draft and easy maneuverability, it is adaptable for fishing. The vehicle is operated by the feet, leaving the hands of the fisherman free to use his rod and reel and creel. Because the floats are cylindrical and being preferably made of plastic foam material, such as styrofoam, the vehicle will roll across land. For marshy or shallow areas, shallow mud banks, etc., by a combination of rolling and floating, the vehicle will go over these areas also. It is not impeded by weeds or other marine plants and readily goes over them without fouling the paddles.

Also, I have found it desirable to journal the cranks to the treadle boards through tubes which are held by rubber straps to the treadle board. Halyards placed to these tubes make it possible to pull the tubes on the treadle boards and, therefore, to steer the vehicle by moving the crankshafts. Children playing on these vehicles on land can steer them slightly by pulling the crankshafts back. Also, with the halyards attached to the tubes, steadying means are provided to help the operator balance himself.

2. Objects of the Invention.

An object of this invention is to propel a water vehicle.

Other objects are to achieve the above with a device that is sturdy, compact, durable, lightweight, simple safe, efficient, versatile, and reliable, yet inexpensive and easy to manufacture, operate, and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING

FIG. 1 is a perspective view of an embodiment of my invention in use.

FIG. 2 is a bottom plan view thereof with the treadle boards positioned one forward and one aft.

FIG. 3 is a portside view thereof with the port treadle board in the down position.

FIG. 4 is a sectional view taken substantially on line 4—4 of FIG. 2.

DESCRIPTION OF THE PREFERRED EMBODIMENT

Figure 5:
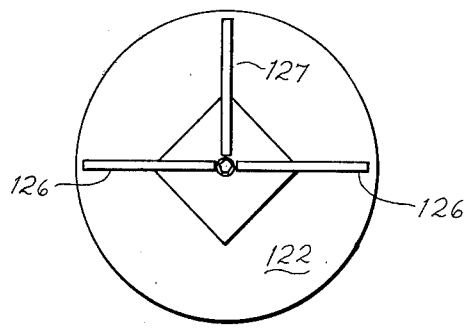
FIG. 5 is a side elevational view of a modified wheel with paddle.

Referring more particularly to the drawing, particularly FIGS. 1–4, the vehicle has forward crankshaft 10 and after crankshaft 12. Each crankshaft has stub axle 14 on each end thereof. The stub axles of each crankshaft are coaxial. Each crankshaft has port crank 16 and starboard crank 18. The cranks are between the stub axles 14 and the throw from the stub axles are equal and opposite. Specifically, I have had good success using a throw of three inches (7.5cm). The crankshaft is conveniently constructed of one and one-half inch pipe (4cm) with stub axles and each crank having a 14 inch (36cm) length. Each of the pipes are welded to center strap 20; the cranks being on six-inch (15cm) centers along the center strap 20.

A cylindrical float 22 is attached on each stub axle coaxial therewith. I have had good success using a styrofoam float 24 inches (61cm) in diameter and 15 inches (38cm) in length. I have had good success with floats having a radial outboard face. A paddle assembly is constructed having polygon board 24 with a plurality of triangular paddles 26 attached thereto as illustrated. Then with a nut internally welded in the pipe forming the stub axle 14, a threaded bolt 28 holds the board 24 firmly in place. Thus bolt 28 forms a portion of the stub axle 14. It may be seen that the board 24 likewise holds the cylindrical float 22 firmly to the stub axle. As more readily seen in the drawing, the forward floats 22 have a hexagon board 24. The paddle, as previously stated, are triangular and are mounted normal to the board with the larger portion at the periphery of the board 24. They are radially placed with one of the angles of the triangle adjacent to the center of the board 24, as seen in the drawing.

For the rear board 24 I prefer to use a triangle board 24 with only three paddles 26. Drag paddle 27, is aligned with the crank 16 or 18 nearest to it. Referring particularly to FIG. 2, it may be seen that the port drag paddle 27 is aligned with the port crank 16 and, therefore, when the port crank 16 is down, as seen in FIG. 3, the port drag paddle 27 will be vertically down. It will be obvious that while the port after float 22 has the drag paddle 27 directly downward, the starboard after float will have the drag paddle 27 directly upward and two other fins 26 equally spaced from a downward position.

Port treadle board 30 is journaled to the two port cranks 16. Likewise, starboard treadle board 32 is journaled to the two starboard cranks 18. I have had good success having the treadle boards journaled to the cranks on 48 inch (122cm) centers.

An angled guide fin 34 is located on each of the treadle boards behind the aft crankshaft 12. These guide fins are set at an angle, as illustrated, i.e., the starboard guide fin is set on the starboard board 32 with the back to the outboard and the front to the inboard. They also are triangular with the angle forward.

The treadle boards 30 and 32, as illustrated in FIGS. 1–4, are journaled to the cranks 16 and 18 by attaching two slats to the treadle board extending downward and then having a bolt (not shown in the drawing) extending across the surface of the slats to hold the treadle boards in position on the cranks.

Figure 6:
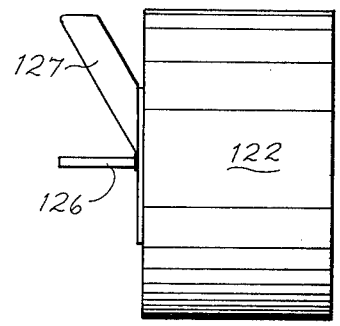
FIG. 6 is a front elevational view of the modified wheel with paddle as shown in FIG. 5
Figure 10:
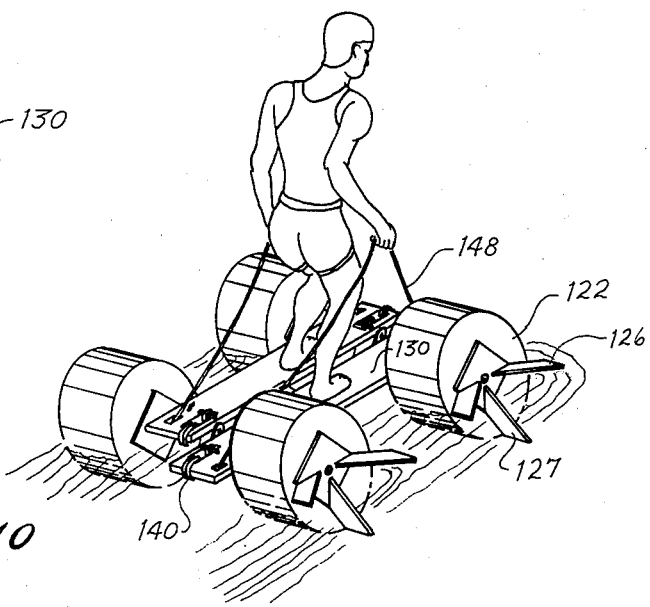
FIG. 10 is a perspective view of a complete embodiment showing the modifications of FIGS. 5–10.

Referring to FIGS. 5, 6, and 10, there may be seen another embodiment. In this embodiment the wheel paddles are arranged with two power paddles 126 extending diametrically from the stub axle. Drag paddle 127 is at right angles to the power paddles 126. As before the drag paddle 127 is aligned with the crank nearest thereto. Therefore, when the drag paddle is down, it tends to turn the vehicle as before, but when the drag paddle is up, there is no paddle in the water, assuming the vehicle floats 122 are at least half out of the water. As may be seen in FIGS. 5, 6, and 10 of the drawing, the paddles in this case are a trapezodial in shape and angled away from the outboard face of the float 122.

Figure 7:
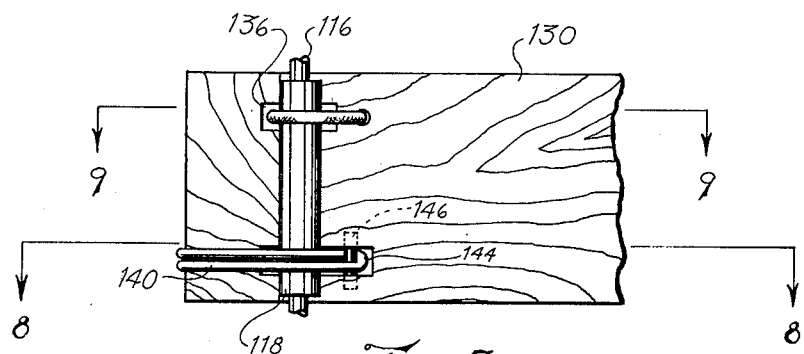
FIG. 7 is a bottom plan view of a modified method of attaching the cranks to the treadle board.
Figure 9:
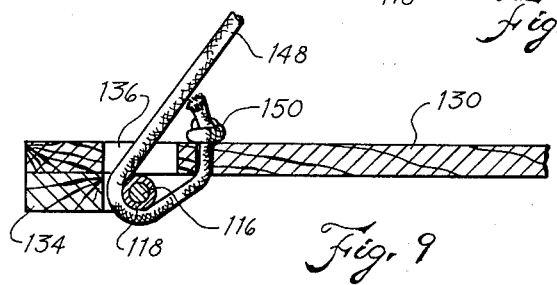
FIG. 9 is a sectional view taken on line 9—9 of FIG. 7 showing the rope.
Figure 8:
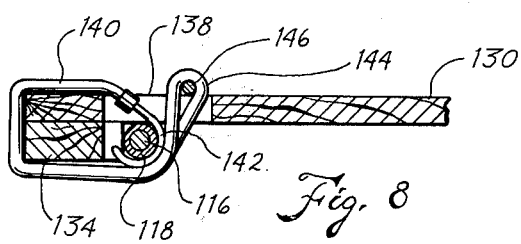
FIG. 8 is a sectional view taken on line 8—8 of FIG. 7 showing the rubber straps.

Referring to FIGS. 7, 8, and 9, there may be seen a modified manner of journaling the treadle board 130 to the crank. In the embodiment there illustrated, the crank 116 is placed within tube 118. The tube will have a length approximately equal to the width of the treadle board 130.

Patch 134 is attached even with each end of each treadle board 130. Halyard notch 136 and strap notch 138 cut through the boards 130 and the patch 134 beneath it. As may be seen in the drawing, the strap notch is slightly longer than the halyard notch. The halyard hole is drilled immediately centerboard of the halyard notch 136.

With the tube 118 positioned in the angle formed between the board 130 and the patch 136, rubber strap 140, having hook 142 attached on each end, is used to attach resiliently the tube in position. The two hooks 142 are hooked over the tube 118 and the strap is then reeved above the treadle board 130 around the end and under the patch 134 and uner the tube 118. The bight 144 is brough up through the centerboard portion of the strap notch 138 and belayed to pin 146. I have found that a short piece of dowel stock is satisfactory to make the pin 146. It may be seen that the tubes are under each of the treadle boards against the patch and that the resilient means in the form of the strap 140 bias the tubes against the patch, and the crank 118 is journaled within the tube.

Halyard 148 is stopped as by an overhand knot 150 above the treadle board extending through the hole above described. The halyard is then reeved through the hole under the tube 118 and through the halyard notch 136 back above the board 130, as illustrated. There the halyard extends to the opposite end of the board where it is likewise used. Thus, it may be seen that dirigible means are provided because pulling the halyard 148 will haul the tube away from the patch 136 against the resilient means of the rubber strap 140.

As an aid to correlating the terms of the claims to the exemplary drawing, the following catalog of elements is provided:

| 10 | crankshaft, forward | 116 | crank |
|----|---------------------|-----|-------|
| 12 | crankshaft, after | 118 | tube |
| 14 | stub axle | 122 | float |
| 16 | crank, port | 124 | board |
| 18 | crank, starboard | 126 | power paddle |
| 20 | strap, center | 127 | drag paddle |
| 22 | float, cylindrical | 130 | treadle |
| 24 | board | 134 | patch |
| 26 | fins | 136 | halyard notch |
| 27 | fin | 138 | strap notch |
| 28 | bolt | 140 | strap |
| 30 | treadle board, port | 142 | hook |
| 32 | treadle board, starboard | 144 | bight |
| 34 | fin, guide | 146 | dowel stock pin |
|    |  | 148 | halyard |
|    |  | 150 | knot |

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific examples above do not point out what an infringement of this patent would be, but are to enable the reader to make and use the invention.

I claim as my invention:
1. A water vehicle comprising:
   a. two crank shafts,
   b. each crankshaft having
      i. axle stubs on each end, and ii. two cranks arranged port and starboard between the axle stubs,
iii. the cranks having an opposed throw from the axle stub,
c. treadle boards arranged one port and one starboard,
d. the port treadle board journaled to the port crank of each crankshaft,
e. the starboard treadle board journaled to the starboard crank of each crankshaft,
f. a float mounted on each axle stub, and
g. each float having an outboard face thereon, and
h. paddles on said outboard face of each float.

2. The invention as defined in claim 1 with additional limitations of
j. a patch on the bottom of each treadle board near each end thereof,
k. a tube under each end of the treadle board against said patch,
m. resilient means on each treadle board for biasing the tube against the patch, and
n. one of said cranks journaled in each tube.

3. The invention as defined in claim 2 with an additional limitation of
o. dirigible means connected to each tube for moving said tube from said stop.

4. The invention as defined in claim 2 wherein
o. said resilient means is a doubled rubber strap with both ends hooked to the tube and the doubled strap reeved upward around the end of the board and back under the tube and back through the board where the bight of the strap is belayed to dowel stock above the board.

5. The invention as defined in claim 1 with additional limitations of
j. the aft floats having three paddles placed thereon,
k. one of said paddles being a drag paddle which is aligned with the crank nearest thereto
m. so that when the port treadle board is down the port aft float will have said drag paddle projecting directly down and the starboard aft float will have said drag paddle pointing directly up.

6. The invention as defined in claim 5 with an additional limitation of
n. the other two paddles are at right angles to the drag paddle.

7. The invention as defined in claim 6 with an additional limitation of
o. the paddles on the forward floats the same as on the aft floats.

8. The invention as defined in claim 1 with additional limitations of
j. each treadle board extending aft of the rear crankshaft,
k. a guide fin set on the bottom of each treadle board aft of the rear crankshaft angling outboard
m. so that when the treadle board is depressed and stationary, the guiding fin tends to turn the water vehicle.

9. The invention as defined in claim 1 with an additional limitation of
j. said paddles angled outward from said float.

10. The invention as defined in claim 1 wherein
j. said stub axles are coaxial and
k. said floats are
   i. cylindrical and
   ii. concentric with the stub axles.

11. The invention as defined in claim 10 wherein
m. each crank has an equal and opposite throw from the stub axles axis.

12. The invention as defined in claim 11 with additional limitations of
n. the aft floats having three paddles placed thereon,
o. one of said paddles being a drag paddle which is aligned with the crank nearest thereto
p. so that when the port treadle board is down the port aft float will have said drag paddle projecting directly down and the starboard aft float will have said drag paddle pointing directly up.

13. The invention as defined in claim 12 with an additional limitation of
q. the other two paddles are at right angles to the drag paddle.

14. The invention as defined in claim 13 with an additional limitation of
r. the paddles on the forward floats the same as on the aft floats.

15. The invention as defined in claim 14 with additional limitations of
s. a patch on the bottom of each treadle board near each end thereof,
t. a tube under each end of the treadle board against said patch,
u. resilient means on each treadle board for biasing the tube against the patch, and
v. one of said cranks journaled in each tube.

16. The invention as defined in claim 15 with an additional limitation of
w. dirigible means connected to each tube for moving said tube from said stop.

17. The invention as defined in claim 16 wherein
x. said dirigible means is a halyard
y. stopped above the board and reeved through the board around the tube and back above the board.

18. The invention as defined in claim 17 wherein
z. said resilient means is a doubled rubber strap with both ends hooked to the tube and the doubled strap reeved upward around the end of the treadle board and back under the tube and back through the treadle board where the bight of the strap is belayed to dowel stock above the treadle board.

19. The invention as defined in claim 18 with an additional limitation of
aa. said paddle angled outward from said float.

20. The invention as defined in claim 19 with additional limitations of
bb. each treadle board extending aft of the rear crankshaft,
cc. a guide fin set on the bottom of each treadle board aft of the rear crankshaft angling outboard
dd. so that when the treadle board is depressed and stationary, the guiding fin tends to turn the water vehicle.

* * * * *